(12) United States Patent
Hu et al.

(10) Patent No.: US 12,227,123 B2
(45) Date of Patent: Feb. 18, 2025

(54) METHOD FOR OPERATING A HEADLIGHT SYSTEM OF A MOTOR VEHICLE

(71) Applicant: Robert Bosch GmbH, Stuttgart (DE)

(72) Inventors: Jian Hu, Leonberg (DE); Oliver Altergott, Wuestenrot (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 17/837,336

(22) Filed: Jun. 10, 2022

(65) Prior Publication Data

US 2022/0396197 A1 Dec. 15, 2022

(30) Foreign Application Priority Data

Jun. 14, 2021 (DE) ...................... 10 2021 205 993.7

(51) Int. Cl.
*B60Q 1/06* (2006.01)
*B60Q 1/14* (2006.01)
*B60Q 1/24* (2006.01)

(52) U.S. Cl.
CPC ................. *B60Q 1/06* (2013.01); *B60Q 1/14* (2013.01); *B60Q 1/249* (2022.05); *B60Q 2300/30* (2013.01)

(58) Field of Classification Search
None
See application file for complete search history.

(56) References Cited

U.S. PATENT DOCUMENTS

| | | | | |
|---|---|---|---|---|
| 2016/0318437 A1* | 11/2016 | Vilakathara | .......... | H05B 47/125 |
| 2017/0050556 A1* | 2/2017 | Nakashima | ............ | B60Q 1/085 |
| 2019/0289282 A1* | 9/2019 | Briggs | ................. | H04N 13/239 |
| 2020/0072432 A1 | 3/2020 | Spencer | | |
| 2020/0398735 A1* | 12/2020 | Lee | ........................... | B60Q 1/06 |
| 2021/0089843 A1* | 3/2021 | Mizoguchi | ............. | G06V 10/22 |
| 2021/0213872 A1* | 7/2021 | Sung | ...................... | G06V 20/56 |
| 2021/0403015 A1* | 12/2021 | Kato | ..................... | B60W 40/02 |
| 2022/0035067 A1* | 2/2022 | Mahapatra | ............. | G06V 20/52 |

FOREIGN PATENT DOCUMENTS

| | | |
|---|---|---|
| DE | 10133945 A1 | 2/2003 |
| DE | 102005046456 A1 | 3/2007 |
| DE | 102007028658 A1 | 12/2008 |
| DE | 102009051485 A1 | 6/2010 |
| DE | 102014204770 A1 | 8/2015 |
| DE | 102016013292 A1 | 5/2018 |
| JP | 2016088283 A | 5/2016 |

* cited by examiner

*Primary Examiner* — Christian Chace
*Assistant Examiner* — Shayne M. Gilbertson
(74) *Attorney, Agent, or Firm* — NORTON ROSE FULBRIGHT US LLP; Gerard A. Messina

(57) ABSTRACT

A method for operating a headlight system of a motor vehicle, which during operation, illuminates an overall illumination area in the area surrounding the motor vehicle. At least two sensors are provided which detect objects in different associated sensor regions, the sensor regions of the sensors overlapping in an overlap region within the overall illumination area. The data of the sensors are fused to ascertain the existence of an object in the overlap region. Upon confirmation of the existence of the object, a zone in the overall illumination area in which the object is located is selectively excluded from illumination. A motor vehicle having a headlight system operated in this manner is also described.

10 Claims, 4 Drawing Sheets

METHOD FOR OPERATING A HEADLIGHT SYSTEM OF A MOTOR VEHICLE

FIELD

The present invention relates to a method for operating a headlight system of a motor vehicle that selectively illuminates the area surrounding the motor vehicle. The present invention also relates to a motor vehicle having a headlight system operated in this manner.

BACKGROUND INFORMATION

Headlights for motor vehicles are used to illuminate the area surrounding the motor vehicle, particularly to improve visibility for a motor-vehicle driver while driving. What are referred to as intelligent headlight systems are used to selectively illuminate the surroundings of the motor vehicle. In so doing, zones are blocked out selectively in an overall illumination area in order not to blind an object located in the overall illumination area or at least to reduce such blinding.

In order to achieve such selective illumination of the surrounding area, Japan Patent Application No. JP 2016 88 283 A2 describes providing on the motor vehicle a camera aimed forward in the direction of travel, which detects objects in the surroundings in the front-end section of the motor vehicle. Upon detection of an object by the camera, a zone in which the object is located is determined in the overall illumination area of the headlight system and excluded individually from illumination. To improve the determination of the zone, also mounted on the headlight system is a radar sensor which likewise detects objects in the overall illumination area. Because of the close placement of the radar sensor to the headlight system, it is thus possible to correct the zone determined previously by the camera.

U.S. Patent Application Publication No. US 2020/0072432 A1 describes, in addition to using a camera, using a GPS module or radar beams to determine the zones to be blocked out in an overall illumination area of a headlight system.

SUMMARY

An object of the present invention is to provide improved or at least different embodiments for a method to operate a headlight system of a motor vehicle of the type indicated at the outset, as well as for such a motor vehicle, the specific embodiments being characterized by improved exclusion of objects from illumination in the overall illumination area of the headlight system.

This object may be achieved by to the present invention. Advantageous specific embodiments are disclosed herein.

According to an example embodiment of the present invention, in order to sense an area illuminated in its entirety by a headlight system of a motor vehicle during operation, also referred to hereinafter as overall illumination area, providing at least two sensors which sense different regions in the area surrounding the motor vehicle, also referred to hereinafter as sensor regions, the sensor regions overlapping in an overlap region within the overall illumination area, and fusing the data acquired by the sensors in order to better and more precisely recognize objects in the overlap region, and in response to such a recognition, to selectively exclude the object from illumination in the overall illumination area. The fusion of the data thus leads to an object recognition carried out with the aid of the fused sensor data, and therefore to an object fusion. By fusing the data of the sensors, hereinafter also referred to as sensor data, objects in the overall illumination area are recognized more precisely and reliably, and thus objects are blocked out more precisely and reliably. Because the sensor regions differ from one another, the method of the present invention leads to the avoidance, or at least reduction in the number, of objects incorrectly and falsely detected by one of the sensors, thus so-called "false positive recognitions", as well as objects not recognized, thus, so-called "false negative recognitions". The fusion of the sensor data also makes it possible to recognize objects in the area surrounding the motor vehicle, and especially in the overall illumination area, with increased reliability and precision even under varying conditions, for example, under different visibility conditions, weather conditions and the like, and to exclude the objects from illumination in the overall illumination area.

According to the an example embodiment of the present invention, during operation, the headlight system fills the surroundings of the motor vehicle, thus, the overall illumination area, with light. In addition, at least two sensors are provided, each of which senses an associated sensor region in the surroundings of the motor vehicle. In this context, at least two of the sensors sense sensor regions differing from each other, which overlap in an overlap region within the overall illumination area. If an object is detected by the sensors in an overlap region, the data of the sensors associated with the overlap region are then fused in order to determine the actual existence of the object in the overall illumination area based on the fused sensor data. If the existence of the object in the overall illumination area is determined and thus confirmed, a zone in which the object is located is selectively blocked out in the overall illumination area.

The block-out in the overall illumination area, and thus in the zone, is used to avoid or at least to reduce blinding of the object. The zone is thus a glare-free zone. For this purpose, the headlight system may either block out the zone completely or dim the illumination in the zone.

The headlight system, particularly the motor vehicle, is designed for selective and thus individual block-out in the overall illumination area.

The headlight system may be designed as needed to achieve this.

With this in mind, the headlight system preferably includes at least one matrix LED headlight. This allows simple, reliable and precise illumination and exclusion from illumination in the overall illumination area.

Expediently, the overall illumination area is filled with light with the exception of the at least one zone.

The objects which trigger a selective block-out in the associated zone are appropriately those which may be blinded in the overall illumination area. In particular, such an object is another vehicle, a person and the like.

Preferably, the sensor data of all sensors are collected and evaluated together in order to determine objects and associated zones in the overall illumination area which are selectively blocked out. In other words, prior to the detection of objects, all data are fused and evaluated together before at least one zone is determined and excluded from illumination. This leads to increased precision in the selective block-out in the overall illumination area.

In principle, the method may be carried out for all objects detected by the sensors.

Reduced expenditure accompanied at the same time by high reliability may be achieved by carrying out the method in the case of newly detected objects.

Specific embodiments are considered to be preferred in which the existence of an object in the overlap region of two sensors is confirmed if both associated sensors detect the object in the overlap region and the detected objects are in closer proximity to each other than a threshold value. In other words, the data of the sensors are fused and analyzed as to whether both sensors belonging to the overlap region are detecting the same object. In addition, a comparison is carried out between the sensor data inferring the object, the existence of the object being confirmed in the case of objects which are similar and thus whose proximity to one another is below the threshold value. In particular, this therefore prevents different objects in the overlap region from being recognized as the same object. Moreover, the position of the object in the overall illumination area is determined more precisely, resulting in increased precision in determining the associated zone.

Preferably, in each case sensors of differing type form an overlap region. That is, at least one of the overlap regions of sensor regions is formed by different kinds of sensors. Reliability and precision in the recognition of objects in the overlap region is thus increased.

If an object in the overlap region is detected by only one of the associated sensors, advantageously the quality of the associated sensors is taken into account in order to assess the existence of the object in the overlap region. In so doing, a higher weight is assigned to the sensor of higher quality in the assessment.

In this context, preferably the existence of the object in the overlap region is confirmed if the sensor having the higher quality detects the object. Consequently, it is also possible to recognize objects and to block out associated zones if only one of the sensors detects the object in the overlap region.

If the object in the overlap region is detected only by the sensor having lower quality, it is possible to negate the existence of the object and therefore not to determine and block out any corresponding zone. Alternatively or additionally, it is possible to assume a low probability for the existence of the object. This low probability may then be considered in the case of the fused sensor data for the confirmation of the existence of the object, for instance, if the object moves into the sensor region of a further sensor.

Specific embodiments of the present invention preferred in which the existence of an object outside of the at least one overlap region is confirmed, if the associated sensor detects the object. Thus, if an object is detected by a sensor outside of the at least one overlap region, then the existence of this object is confirmed and an appropriate zone is ascertained and blocked out for the associated object.

In this context, it is preferred if the overall illumination area is covered by two or more overlap regions.

It should be understood that in addition to the method, a motor vehicle having a headlight system operated in this manner falls within the scope of the present invention, as well. Thus, besides the headlight system, the motor vehicle has at least two sensors, each of which during operation detects objects in an associated sensor region in the surroundings of the motor vehicle, the sensor regions of at least two of the sensors differing from each other and overlapping in an overlap region within the overall illumination area. To carry out the method, the motor vehicle is designed accordingly. To that end, a control device may be connected to the headlight system and the sensors in a manner allowing communication, and may be designed accordingly.

The control device may be a component of the headlight system and/or of at least one of the at least two sensors.

It is likewise possible that the control device is distributed within the motor vehicle. Thus, the control device may have components in the headlight system, e.g., at least one control unit, which controls the headlight system appropriately on the basis of the ascertained zone. In the same way, in at least one of the sensors, the control device may have components for fusing the sensor data, e.g., a control unit.

The sensors and/or control units are connected advantageously to each other by a bus system, e.g., a CAN bus and/or ethernet.

In preferred specific embodiments of the present invention, the motor vehicle has at least three sensors, each of which senses one associated sensor region differing from one another.

Specific embodiments of the present invention are considered to be advantageous in which at least one of the at least two sensors senses a forward section of the motor vehicle in the direction of travel, that is, a front-end section of the motor vehicle.

Specific embodiments of the present invention are preferred in which at least one of the at least two sensors senses an area of the motor vehicle at the side in the direction of travel. In particular, even during passing maneuvers of the motor vehicle or of other vehicles, it is thus possible to detect objects, especially other vehicles, reliably and with great precision and to confirm their existence in order to block out corresponding zones in the overall illumination area.

According to an example embodiment of the present invention, the motor vehicle preferably has an optical camera as a first sensor which during operation, senses the front-end section of the motor vehicle forward in the direction of travel as sensor region, hereinafter also referred to as first sensor region. A cost-effective implementation is thus achieved, since motor vehicles are increasingly equipped with such an optical camera in any case.

In addition, specific embodiments of the present invention are preferred in which the motor vehicle has at least one sensor, hereinafter also referred to as second sensor, which during operation, senses a sensor region at the side in the direction of travel and going laterally beyond the overall illumination area. The motor vehicle thus has at least one second sensor which during operation, senses a sensor region at the side in the direction of travel and extending laterally beyond the overall illumination area counter to the direction of travel, hereinafter also referred to as second sensor region. Particularly preferred, in this context, the at least one second sensor region forms an overlap region with another sensor region.

Specific embodiments of the present invention are advantageous in which the first sensor region of the optical camera in each case forms an overlap region with at least one of the at least one second sensor regions.

The motor vehicle in each case advantageously has such a second sensor on both sides transversely to the direction of travel, the respective second sensor region advantageously forming an overlap region with the first sensor region.

In principle, the respective second sensor may take any form as desired.

Specific embodiments of the present invention are preferred in which at least one of the at least one second sensors is a radar sensor. The overlap regions of the second sensors and of the first sensor are therefore formed of different types of sensors whose advantages are combined with each other in order to achieve an improved and more precise confirmation of the existence of objects.

In addition, it is preferred if the first sensor region of the first sensor and thus of the optical camera in the front-end section of the motor vehicle overlaps with a sensor region of a further sensor advantageously differing from the camera and also referred to hereinafter as third sensor. That is, the motor vehicle advantageously has a third sensor differing from the first sensor, and expediently also from the respective second sensor, which during operation, senses a front-end section of the motor vehicle forward in the direction of travel as a third sensor region. In this connection, the third sensor is advantageously a sensor of a different type than the optical camera.

The third sensor is preferably a radar sensor.

It should be understood that at least one of the sensors may also be implemented differently. In particular, it is possible that at least one of the sensors, especially at least one of the second sensors and/or the third sensor, is a lidar sensor.

Further features and advantages of the present invention are derived the disclosure herein.

It should be understood that the features indicated above and the features yet to be explained in the following are usable not only in the combination indicated in each instance, but also in other combinations or singularly without departing from the scope of the present invention.

Preferred exemplary embodiments of the present invention are represented in the figures and explained in greater detail in the following description, identical reference numerals referring to identical or similar or functionally identical components.

DETAILED DESCRIPTION OF EXAMPLE EMBODIMENTS

Figure 1:
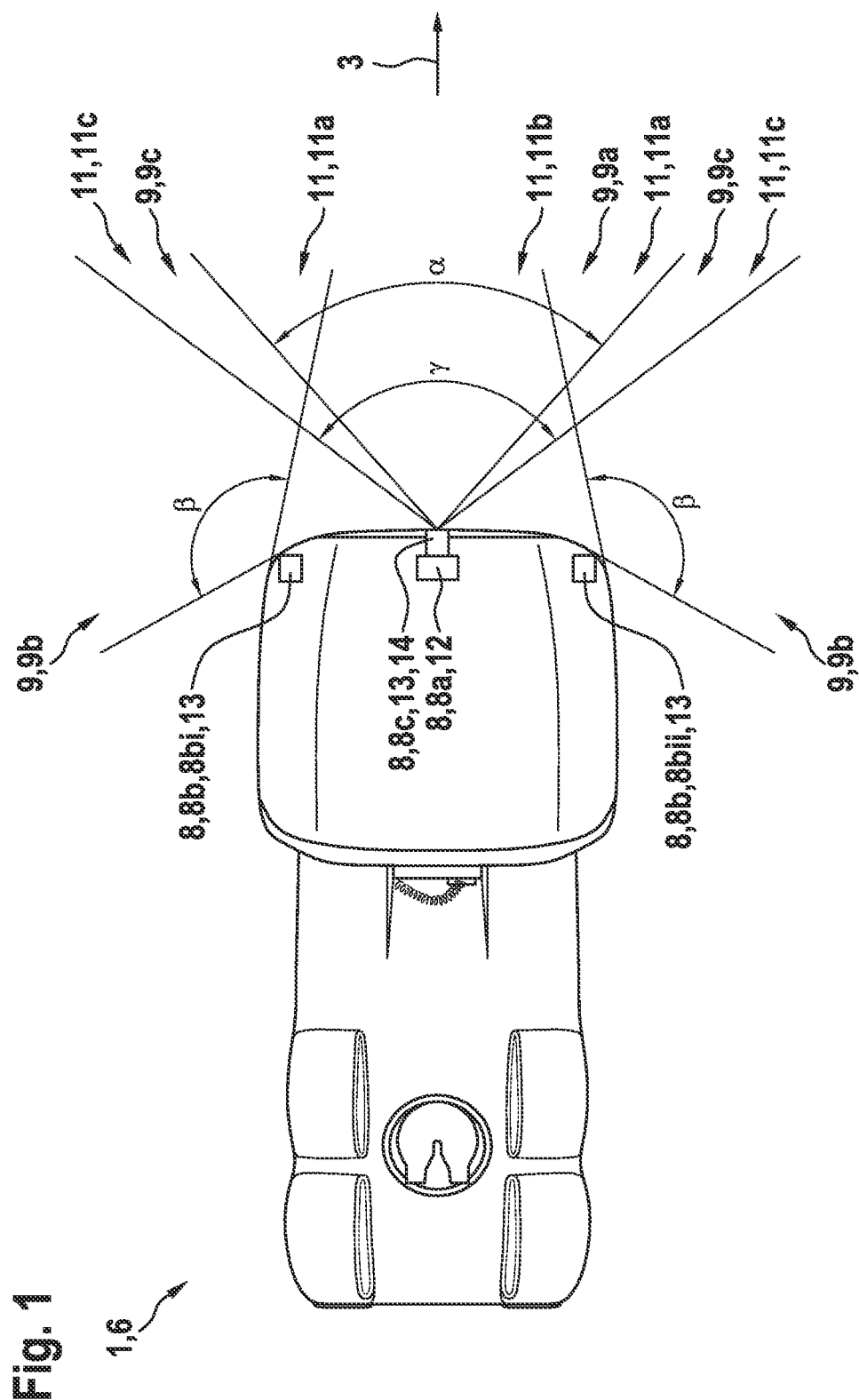
FIG. 1 shows a top view of a motor vehicle having sensors and a headlight system.
Figure 2:
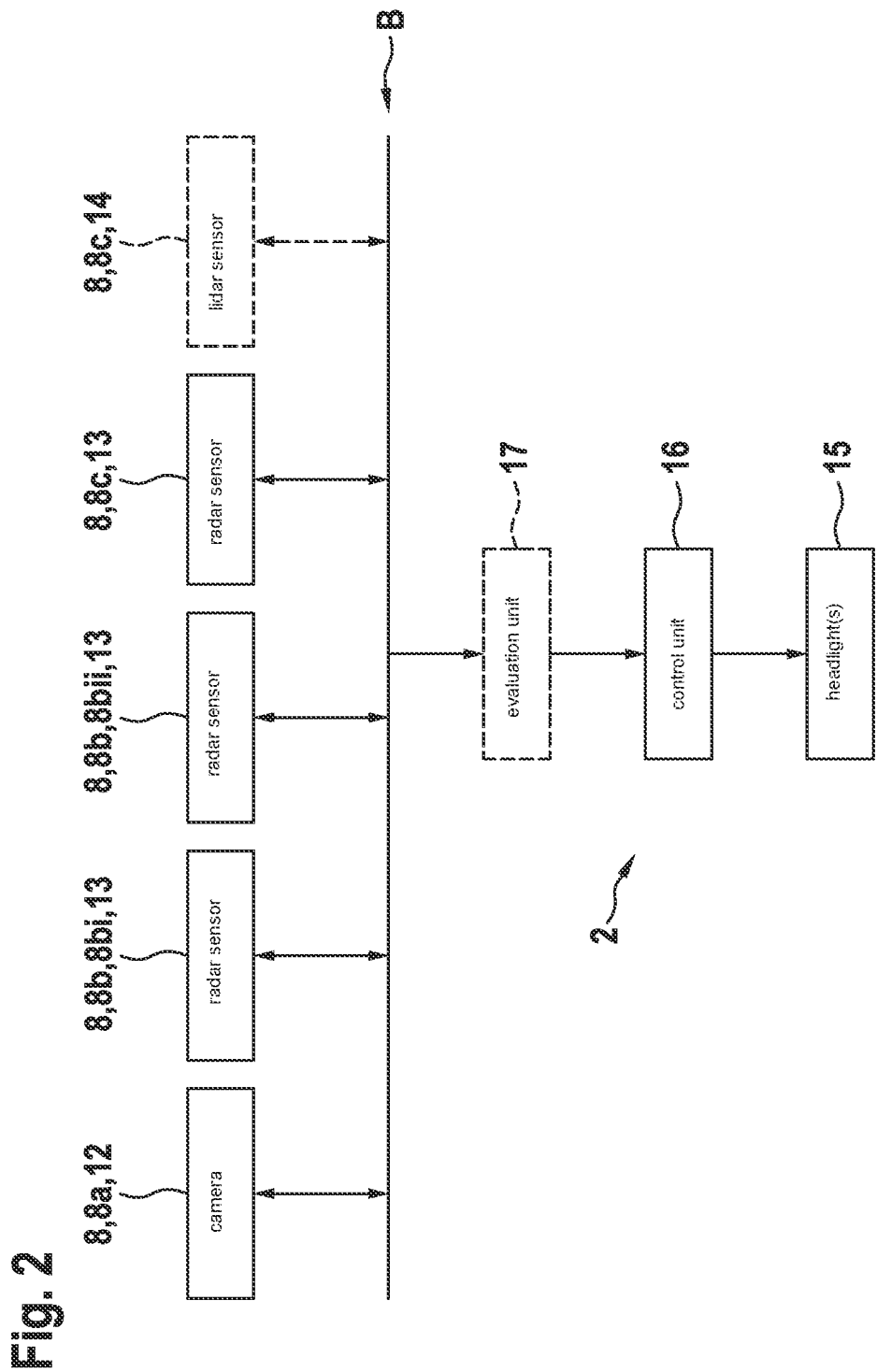
FIG. 2 shows a system architecture including the sensors and the headlight system.
Figure 3:
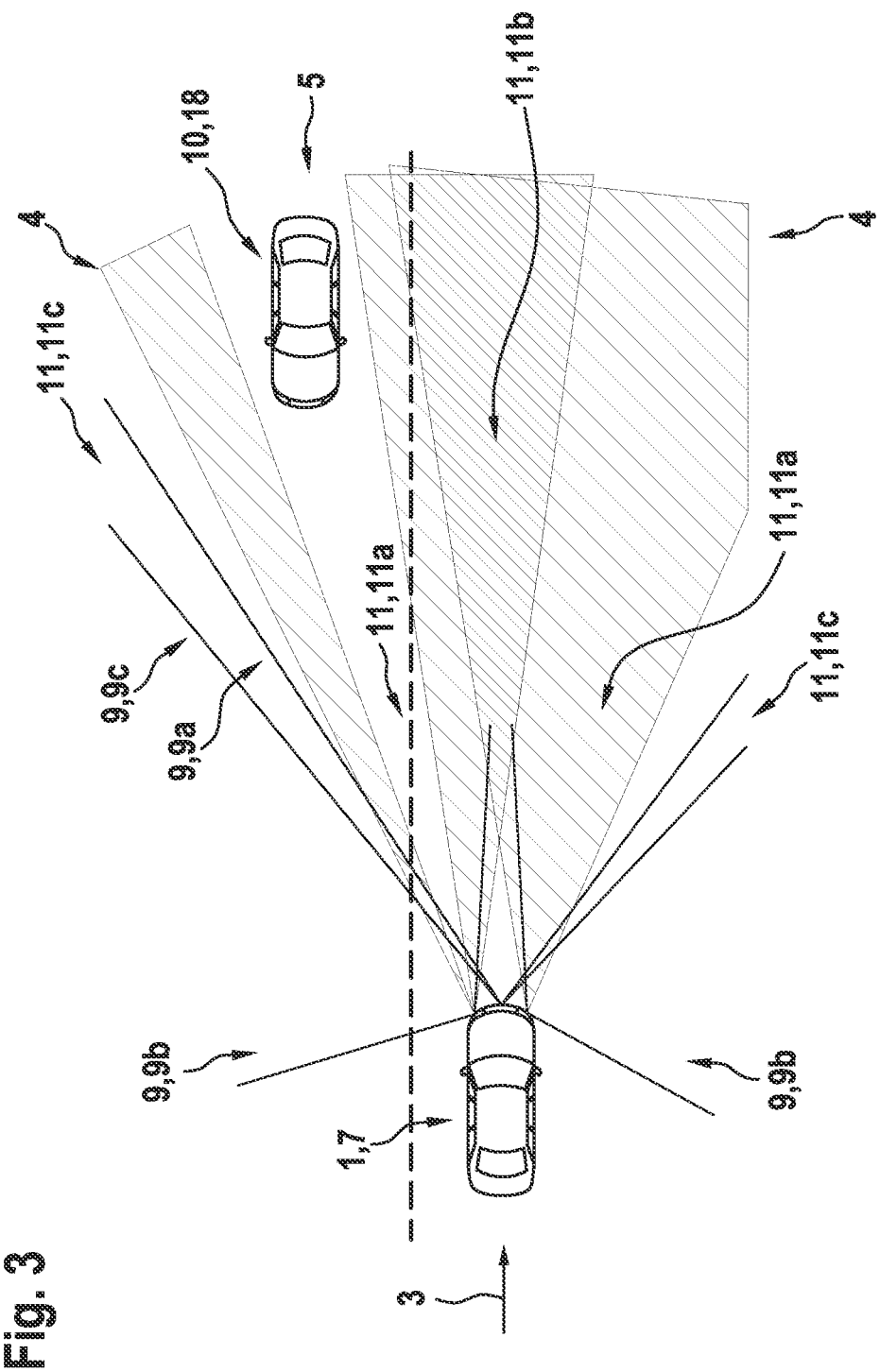
FIG. 3 shows a top view of a traffic situation with the motor vehicle.

A motor vehicle 1, as shown by way of example in FIGS. 1 and 3, includes a headlight system 2 which is represented only in FIG. 2. Headlight system 2 illuminates a front outer area of motor vehicle 1 in direction of travel 3 of motor vehicle 1. In this context, headlight system 2 is capable of illuminating an area 4 in its entirety, which hereinafter is also referred to as overall illumination area 4 and is shown only in FIG. 3. In addition, headlight system 2 is able to selectively block out zones 5 within overall illumination area 4. In the exemplary embodiments shown, headlight system 2 has at least one matrix LED headlight 15 for this purpose (see FIG. 2).

Motor vehicle 1 may be of any type. Purely by way of example, motor vehicle 1 in the exemplary embodiment of FIG. 1 is a commercial vehicle 6, and in the exemplary embodiment of FIG. 3, is a passenger car 7.

To sense the area surrounding motor vehicle 1, motor vehicle 1 also has at least two sensors 8, each of which detects objects 10 in an associated sensor region 9, as can be gathered from FIGS. 1 and 3. Sensors 8 are represented only symbolically in FIGS. 1 and 3. In this case, at least two of the at least two sensors 8 have sensor regions 9 differing from each other, which overlap in an overlap region 11 in overall illumination area 4.

In the exemplary embodiments shown, motor vehicle 1 has an optical camera 12 as a first sensor 8a. During operation, first sensor 8a and thus camera 12 senses a front-end section of motor vehicle 1 forward in direction of travel 3 as associated sensor region 9a, which is also referred to hereinafter as first sensor region 9a. First sensor region 9a is also indicated with an associated angle α in FIG. 1. Motor vehicle 1 also has two further sensors 8b which detect objects 10 in a sensor region 9b at the side in direction of travel 3, also referred to hereinafter as second sensor region 9b. Second sensors 8b are disposed facing away from each other transversely to direction of travel 3. Respective second sensor 8b thus senses an associated second sensor region 9b at the side in direction of travel 3, which, as can be gathered from FIG. 3, advantageously extends laterally beyond overall illumination area 4 counter to direction of travel 3. Second sensor region 9b of respective second sensor 8b is indicated by angle β in FIG. 1. Respective second sensor 8b in the exemplary embodiments shown is a radar sensor 13. As can be gathered especially from FIG. 1, respective second sensor region 9b together with first sensor region 9a in this case forms a first overlap region 11a. As a result, in each case a first overlap region 11a is formed in the front left surrounding field and in the front right surrounding field. In the exemplary embodiments shown, motor vehicle 1 also has a third sensor 8c which differs from first sensor 8a and, like first sensor 8a, senses a front-end section of motor vehicle 1 forward in direction of travel 3 as associated sensor region 9c, which is also referred to hereinafter as third sensor region 9c. Third sensor region 9c is identified by angle γ in FIG. 1. As can also be gathered especially from FIG. 1, third sensor region 9c in the exemplary embodiments shown includes first sensor region 9a and extends laterally beyond first sensor region 9a. That is, angle γ is larger than angle α. As a result, first sensor region 9a and third sensor region 9c form a second overlap region 11b. In addition, third sensor region 9c together with respective second sensor region 9b forms a third overlap region 11c. In other words, two third overlap regions 11c are provided. Third sensor 8c in the exemplary embodiments shown likewise takes the form of a radar sensor 13. However, third sensor 8c may also be a lidar sensor 14.

FIG. 2 shows a system architecture of motor vehicle 1 having sensors 8 and headlight system 2. As can be gathered from FIG. 2, the data of sensors 8, also referred to hereinafter as sensor data, are collected and evaluated together. For this purpose, respective sensor 8 is connected to a bus system B. Bus system B is also connected to headlight system 2. As can be gathered from FIG. 2, in addition to the at least one headlight 15, headlight system 2 may include a control unit 16. The sensor data may be collected and evaluated in one of sensors 8, e.g., in optical camera 12. Likewise for this purpose, as indicated by a dashed line in FIG. 2, an evaluation unit 17 upstream of control unit 16 may be connected to bus system B.

The collected sensor data are evaluated by fusing the sensor data and evaluating them together in order to recognize objects 10 in overall illumination area 4 and to ascertain associated zones 5 for objects 10, as explained in the following with the aid of FIG. 4. As a result, headlight system 2, particularly with the aid of control unit 16, blocks out corresponding zones 5 in overall illumination area 4 in such a way that object 10 in associated zone 5 is glare-free, thus, is not blinded or the blinding is at least reduced.

A corresponding driving situation is illustrated in FIG. 3, object 10 being another vehicle 18. In this case, for the sake of a better overview, sensors 8 are not shown in FIG. 3, and only associated sensor regions 9 and overlap regions 11 are shown.

Figure 4:
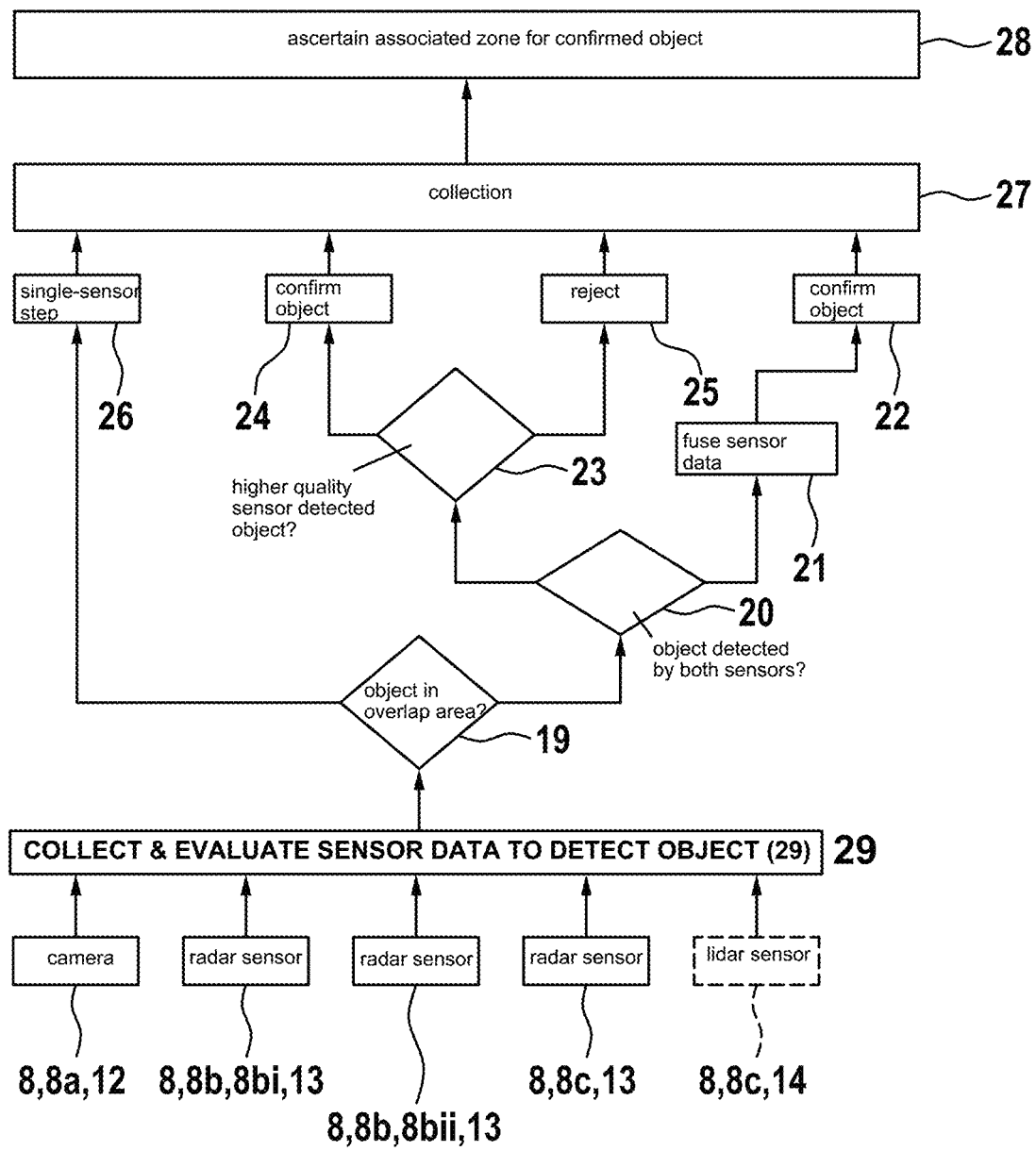
FIG. 4 shows a flowchart to clarify the method for operating the headlight system.

FIG. 4 shows a flowchart to clarify the method for operating headlight system 2. Accordingly, first of all the sensor data of all sensors 8, particularly the raw data, are collected and evaluated together to detect a new object 10 in a step 29. Then, particularly if the new object 10 was detected, the method is continued as follows. First of all, in a step 19, it is checked whether object 10 is in one of overlap regions 11, this step 19 also being referred to hereinafter as overlap-check step 19. If object 10 was detected in one of overlap regions 11, thus, the result of overlap-check step 19 is positive, with a step 20 it is checked whether the object was detected by both sensors 8 forming overlap region 11. This step 20 is also referred to hereinafter as correspondence step 20. If object 10 was detected by both associated sensors 8, thus, the result of correspondence step 20 is positive, then in a following step 21, the sensor data of associated sensors 8 are fused and compared to each other, this step 21 also being referred to hereinafter as fusion step 21. In fusion step 21, in addition, objects 10 ascertained by associated sensors 8 are compared, the existence of object 10 in associated overlap region 11 being confirmed if both associated sensors 8 detect object 10 and detected objects 10 are in closer proximity to each other than a threshold value. If the objects are closer to each other than the threshold value, in a following step 22, the existence of object 10 is confirmed. Step 22 is also referred to hereinafter as multi-sensor object step 22.

If the result in correspondence step 20 is negative, thus, object 10 was detected in one overlap region 11 and only by one of associated sensors 8, then in a following step 23, the quality of sensors 8 forming overlap region 11 is taken into account, this step 23 also being referred to hereinafter as quality-comparison step 23. In quality-comparison step 23, the qualities are compared in terms of whether sensor 8 having the higher quality has detected object 10. If this is the case, in a following step 24, the existence of object 10 is confirmed, this step 24 also being referred to hereinafter as single-sensor-object step 24. If sensor 8 having the lower quality has detected object 10, thus, the result of quality-comparison step 23 is negative, in a following step 25, the existence of object 10 is negated or rejected, or the existence of object 10 is assigned a low probability, this step 25 also being referred to hereinafter as rejection step 25.

As may also be gathered from FIG. 4, if an object 10 was detected outside of overlap regions 11, thus, the result of overlap-check step 19 is negative, in a step 26, the existence of object 10 is confirmed, this step 26 also being referred to hereinafter as single-sensor step 26.

The results of the confirmation or the rejection of detected objects 10 are subsequently collected as consolidated or fused object data in a step 27, which hereinafter is also referred to as collection step 27. That is, the results of multi-sensor-object step 22, single-sensor-object step 24, rejection step 25 and single-sensor step 26 are fed to collection step 27. In a step 28, an associated zone 5 in overall illumination area 4 is then ascertained for respective confirmed object 10, this step 28 also being referred to hereinafter as zone-ascertainment step 28. The result of zone-ascertainment step 28 is supplied to headlight system 2, particularly control unit 16, which subsequently blocks out corresponding zones 5.

A reliable and precise recognition of objects 10 and ascertainment of associated zones 5, and consequently an improved block-out of objects 10 in overall illumination area 4 is thus accomplished.

It goes without saying that the method described is carried out continuously, especially in order to continuously block out objects 10 moving in overall illumination area 4.

What is claimed is:

1. A method for operating a headlight system of a motor vehicle, the method comprising:
   illuminating, by the headlight system, an overall illumination area in an area surrounding the motor vehicle;
   sensing, by each of at least two sensors, an associated sensor region in the area surrounding the motor vehicle, at least two of the sensors sensing sensor regions differing from each other, which overlap in an overlap region in the overall illumination area;
   determining whether an object is in the overlap region, and when the object is not in the overlap region, performing a single sensor step, and when the object is in the overlap region, determining whether the object is detected by the at least two sensors, and when the object is detected by the at least two sensors, performing the fusing step;
   when the object is not detected by the at least two sensors, determining whether a higher quality sensor detected the object, and when the higher quality sensor does not detect the object, then the existence of the object is rejected, and when the higher quality sensor detects the object, confirming the existence of the object;
   fusing, upon detection by the at least two sensors of the object in the overlap region, sensor data of the sensors associated with the overlap region, and confirming existence of the object in the overall illumination area from the fused sensor data; and
   selectively blocking out, by the headlight system, in response to the confirmation of the existence of the object, a zone in the overall illumination area in which the object is located;
   wherein the headlight system includes at least one headlight that selectively blocks out the zone in the overall illumination area in which the object is located.

2. The method as recited in claim 1, wherein the existence of the object in the overlap region is confirmed when both associated sensors detect the object in the overlap region and detected objects are in closer proximity to each other than a threshold value.

3. The method as recited in claim 1, wherein when the object in the overlap region is detected by only one of the associated sensors, a quality of the sensors is taken into account, and the existence of the object is confirmed when a sensor of the associated sensors having a higher quality detects the object.

4. The method as recited in claim 1, wherein upon detecting the object outside of the at least one overlap region, the existence of the object is confirmed.

5. A motor vehicle, comprising:
   a headlight system which is configured so that during operation, it selectively illuminates an overall illumination area in an area surrounding the motor vehicle; and
   at least two sensors, each of which during operation detects objects in an associated sensor region in the area surrounding the motor vehicle, the sensor regions of at least two of the sensors differing from each other and overlapping in an overlap region in the overall illumination area;

wherein the headlight system is configured to perform the following:

illuminating, using the headlight system, the overall illumination area in the area surrounding the motor vehicle, determining whether an object is in the overlap region, and if the object is not in the overlap region, performing a single sensor step, and if the object is in the overlap region, determining whether the object is detected by the at least two sensors, and if the object is detected by the at least two sensors, performing the fusing step, if the object is not detected by the at least two sensors, determining if a higher quality sensor detected the object, and if the higher quality sensor does not detect the object, then the existence of the object is rejected, and if the higher quality sensor does detect the object, confirming the existence of the object, fusing, upon detection by the at least two sensors of the object in the overlap region, sensor data of the sensors associated with the overlap region, and confirming existence of the object in the overall illumination area from the fused sensor data, and selectively blocking out from the illumination, by the headlight system, in response to the confirmation of the existence of the object, a zone in the overall illumination area in which the object is located;

wherein the headlight system includes at least one matrix light-emitting diode (LED) headlight that selectively blocks out the zone in the overall illumination area in which the object is located.

6. The motor vehicle as recited in claim 5, wherein the motor vehicle has an optical camera as a first sensor of the at least two sensors, which during operation, senses a front-end section of the motor vehicle forward in a direction of travel as a first sensor region.

7. The motor vehicle as recited in claim 6, wherein the motor vehicle has at least one second sensor of the at least two sensors, which during operation, senses a second sensor region at a side in the direction of travel and extending laterally beyond the overall illumination area counter to the direction of travel, and forms an overlap region with at least one other sensor.

8. The motor vehicle as recited in claim 7, wherein at least one of the at least one second sensors is a radar sensor.

9. The motor vehicle as recited in claim 7, wherein the motor vehicle has a third sensor differing from the first sensor, which during operation, senses a front-end section of the motor vehicle forward in the direction of travel as a third sensor region.

10. The motor vehicle as recited in claim 9, wherein the third sensor is a radar sensor.

* * * * *